United States Patent
Sandy et al.

(10) Patent No.: US 7,532,616 B2
(45) Date of Patent: May 12, 2009

(54) FABRIC ENABLED STORAGE MODULE

(75) Inventors: Douglas L. Sandy, Chandler, AZ (US);
Jeffrey M. Harris, Chandler, AZ (US);
Robert C. Tufford, Chandler, AZ (US)

(73) Assignee: Emerson Network Power - Embedded Computing, Inc., Madison, WI (US)

( * ) Notice: Subject to any disclaimer, the term of this patent is extended or adjusted under 35 U.S.C. 154(b) by 887 days.

(21) Appl. No.: 10/947,970

(22) Filed: Sep. 23, 2004

(65) Prior Publication Data
US 2006/0062245 A1 Mar. 23, 2006

(51) Int. Cl.
*H04L 12/56* (2006.01)
(52) U.S. Cl. ...................................... 370/352
(58) Field of Classification Search ........................ None
See application file for complete search history.

(56) References Cited

U.S. PATENT DOCUMENTS

| | | | | |
|---|---|---|---|---|
| 6,456,498 | B1 * | 9/2002 | Larson et al. | 361/752 |
| 6,751,699 | B1 * | 6/2004 | Langley et al. | 370/360 |
| 6,978,332 | B1 * | 12/2005 | Harris et al. | 710/300 |
| 7,152,126 | B2 * | 12/2006 | Sandy et al. | 710/301 |
| 7,154,747 | B2 * | 12/2006 | Tufford et al. | 361/686 |
| 7,254,039 | B2 * | 8/2007 | Sandy et al. | 710/301 |
| 7,307,987 | B2 * | 12/2007 | Tufford et al. | 370/386 |
| 2003/0101426 | A1 * | 5/2003 | Sarkinen et al. | 716/12 |
| 2006/0036794 | A1 * | 2/2006 | Sandy et al. | 710/302 |
| 2006/0062212 | A1 * | 3/2006 | Sandy et al. | 370/386 |
| 2006/0062213 | A1 * | 3/2006 | Harris et al. | 370/386 |
| 2006/0062226 | A1 * | 3/2006 | Harris et al. | 370/401 |
| 2006/0062227 | A1 * | 3/2006 | Tufford et al. | 370/401 |
| 2006/0184711 | A1 * | 8/2006 | Pettey et al. | 710/316 |

* cited by examiner

*Primary Examiner*—Anh-Vu H Ly
(74) *Attorney, Agent, or Firm*—Harness, Dickey & Pierce, P.L.C.

(57) ABSTRACT

A multi-service platform system, includes a backplane (104), a switched fabric (106) on the backplane, and at least one of a VMEbus network and a PCI network coincident with the switched fabric on the backplane. A payload module (102) has one of a 3U form factor, a 6U form factor and a 9U form factor, where the payload module is communicatively coupled with the backplane using the switched fabric and at least one of the VMEbus network and the PCI network. At least one multi-gigabit connector (118) is coupled to a rear edge (119) of the payload module, where the at least one multi-gigabit connector is coupled to communicatively interface the payload module to the backplane, and where the switched fabric and at least one of the VMEbus network and the PCI network are communicatively coupled with the payload module through the at least one multi-gigabit connector. A storage module (112, 113) is coupled to the payload module, where the storage module is coupled to communicate with the switched fabric.

29 Claims, 5 Drawing Sheets

FABRIC ENABLED STORAGE MODULE

RELATED APPLICATIONS

Related subject matter is disclosed in U.S. patent application entitled "SWITCHED FABRIC MEZZANINE STORAGE MODULE" having application Ser. No. 10/947,738 and filed on the same date herewith and assigned to the same assignee.

BACKGROUND OF THE INVENTION

Storage devices mounted on a payload board can be added to computer systems to increase or augment storage capacity. Storage devices generally communicate to external devices using a storage protocol, such as SCSI, IDE/ATA, and the like. In order to transmit data stored on storage devices, data is generally communicated from the storage devices to a computer system using primarily a parallel multi-drop bus network architecture, such as Peripheral Component Interconnect (PCI) or VERSAmodule Eurocard (VMEbus). A multi-drop parallel bus architecture has the disadvantage that it can only be used to support one instantaneous communication between modules in a computer system or network. Some applications have requirements for simultaneous high bandwidth transfers between storage devices and other devices, such as processors located elsewhere in the embedded computing environment, which cannot be handled by the multi-drop parallel bus architecture.

In the prior art, 6U form factor cards are common. The 3U form factor offers an advantage for applications where physical space is at a premium. The 9U form factor offers an advantage of placing more computing features on a given card. Prior art 3U and 9U form factor expansion cards interface with a backplane using parallel multi-drop networks. This has the disadvantage of being slow and cumbersome for network expansion.

Accordingly, there is a significant need for an apparatus and method that overcomes the deficiencies of the prior art outlined above.

BRIEF DESCRIPTION OF THE DRAWINGS

Referring to the drawing.

Figure 1:
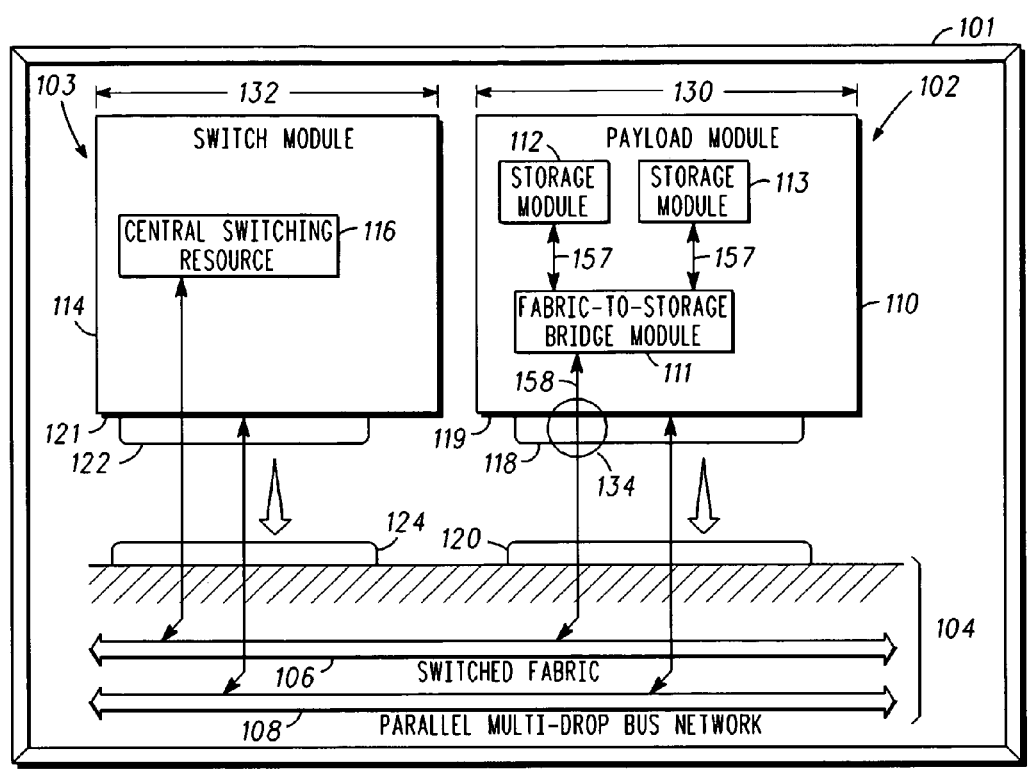
FIG. 1 depicts a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to one embodiment of the invention. Multi-service platform system 100 can include computer chassis 101, with software and any number of slots for inserting modules, which can be, for example and without limitation, a payload module 102, a switch module 103, and the like. Payload module 102 can add functionality to multi-service platform system 100 through the addition of processors, memory, storage devices, device interfaces, network interfaces, and the like. In an embodiment, multi-service platform system 100 can be an embedded, distributed processing computer system, where computer chassis 101 is an embedded computer chassis.

In an embodiment, multi-service platform system 100 can be controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules with communication among the various modules of multi-service platform system 100.

Multi-service platform system 100 can include backplane 104 coupled for receiving payload module 102 and switch module 103. Backplane 104 can include hardware and software necessary to implement a coincident parallel multi-drop bus network 108 and a switched fabric 106. Backplane 104 can include switched fabric 106 and a parallel multi-drop bus network 108. In an embodiment, both switched fabric 106 and parallel multi-drop bus network 108 run concurrently on backplane 104.

In an embodiment, parallel multi-drop bus network 108 can be a VMEbus network. VMEbus network is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network can include VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). VMEbus network 108 is not limited to the use of these VMEbus based protocols and other VMEbus based protocols are within the scope of the invention.

In another embodiment, parallel multi-drop bus network 108 can be a Peripheral Component Interconnect (PCI) network. PCI network can include standard PCI or Peripheral Component Interconnect-X (PCI-X) based protocols. Examples of variants of PCI-X protocols, without limitation, include 133 MHz 64-bit PCI-X, 100 MHz 64-bit PCI-X down to 66 MHz 32-bit PCI-X, and the like. Examples of PCI based protocols (a subset of PCI-X based protocols), can include 66 MHz 64-bit PCI down to 33 MHz 32-bit PCI, and the like.

Switched fabric 106 can use switch module 103, particularly central switching resource 116 on switch module 103, as a hub. Switch module 103 can be coupled to any number of payload modules 102. Switched fabric 106 can be based on a point-to-point, switched input/output (I/O) fabric, whereby cascaded switch devices interconnect end node devices. Although FIG. 1 depicts switched fabric 106 as a bus for diagrammatic ease, switched fabric 106 may in fact be a star topology, mesh topology, and the like as known in the art for communicatively coupling modules. Switched fabric 106 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric 106 can be implemented by using one or more of a plurality of switched fabric network standards, for example and without limitation, InfiniBand™, Serial RapidIO™, FibreChannel™, Ethernet™, PCI Express™, Hypertransport™, and the like. Switched fabric 106 is not limited to the use of these switched fabric network standards and the use of any switched fabric network standard is within the scope of the invention.

In an embodiment of the invention, parallel multi-drop bus network 108 and switched fabric 106 operate concurrently within multi-service platform system 100. In an example of an embodiment, parallel multi-drop bus network 108 can operate as a control plane by synchronizing and organizing activities in multi-service platform system 100. Switched fabric 106 can operate as a data plane by transferring data between individual payload modules 102. In this embodiment, data is transferred faster through the higher bandwidth switched fabric 106, while the parallel multi-drop bus network 108 controls and manages the overall system. This has the effect of increasing the speed of multi-service platform system 100 since data transfers that are in excess of parallel multi-drop bus network 108 bandwidth can take place using switched fabric 106. In an embodiment, payload module 102 is communicatively coupled with backplane 104 using switched fabric 106 and at least one of VMEbus network or PCI network (parallel multi-drop bus network 108).

Multi-service platform system 100 can include any number of payload modules 102 and switch modules 103 coupled to backplane 104. Backplane 104 can include hardware and software necessary to implement a coincident parallel multi-drop bus network 108 and a switched fabric 106.

In an embodiment, payload module 102 can comprise a board 110, for example a printed wire board (PWB), and the like. In an embodiment, payload module 102 can have a form factor 130, which can refer to physical dimensions, electrical connections, and the like, of payload module 102. In an embodiment, payload module 102 can have one of a 3U form factor, 6U form factor or a 9U form factor.

As is known in the art, "U" and multiples of "U" can refer to the width of a module or expansion card. In an embodiment, "U" can measure approximately 1.75 inches. Payload module 102 can have its own specific set of electrical connections to interface with backplane 104 of computer chassis 101. As an example of an embodiment, multi-service platform system 100 can include computer chassis 101 and one or more payload modules 102, each having one of a 3U form factor, 6U form factor or a 9U form factor. In an embodiment, such payload modules 102 can conform to the VITA 46 standard as set forth by VMEbus International Trade Association (VITA), P.O. Box 19658, Fountain Hills, Ariz., 85269.

In an embodiment, switch module 103 can comprise a board 114, for example a printed wire board (PWB), and the like. Coupled to the board 114 can be one or more central switching resources 116 that can for example, function as a hub for switched fabric 106. In an embodiment, switch module 103 can include any combination of processor, memory, storage, communication devices and the like. Switch module 103 can add any type of computing, storage, communication features, and the like to multi-service platform system 100. In an embodiment, switch module 103 can have a form factor 132, which can refer to physical dimensions, electrical connections, and the like, of switch module 103. In an embodiment, switch module 103 can have one of a 3U form factor, 6U form factor or a 9U form factor.

In an embodiment of the invention, backplane 104 and payload module 102 can have a set of interlocking, modular connectors designed to interlock with each other when payload module 102 is placed in a slot of multi-service platform system 100. In the embodiment shown, payload module 102 has at least one multi-gigabit connector 118 coupled to rear edge 119. In an embodiment, at least one multi-gigabit connector 118 can include printed circuit board (PCB) wafers (as opposed to metal pins), where wafers are held together in a plastic housing and can be coupled to the payload module 102 using press to fit contacts. For example, at least one multi-gigabit connector 118 can use PCB based pinless interconnect that uses printed circuit wafers instead of traditional pin and socket contacts.

In an embodiment, at least one multi-gigabit connector 118 can use at least one of single ended or differential pair 134 signal configuration in the same connector. Multi-gigabit connector 118 can transfer data in excess of three (3) gigabits per second per each differential pair 134. In an embodiment, differential pair 134 can be a bonded differential pair. At least one multi-gigabit connector 118 is coupled to communicatively interface payload module 102 with backplane 104, where switched fabric 106 and at least one of VMEbus network or PCI network are communicatively coupled to payload module 102 through at least one multi-gigabit connector 118.

In an embodiment, at least one multi-gigabit connector 118 is coupled to interface with at least one corresponding multi-gigabit connector 120 on backplane 104. At least one corresponding multi-gigabit connector 120 can be a female receptacle with metal beam spring leaf contacts which engage with the PCB wafers of multi-gigabit connector 118 when coupled together.

In an embodiment, at least one multi-gigabit connector 118 spans substantially the entire portion of the rear edge 119 of payload module 102. Rear edge 119 can include any number of multi-gigabit connectors 118 and be within the scope of the invention. In an embodiment, all communication between payload module 102 and backplane 104 occur exclusively through at least one multi-gigabit connector 118. In this embodiment, rear edge 119 of payload module 102 excludes a legacy connector, which can include traditional pin and socket connectors designed for low-speed data transfer. In other words, all data transfer and communication, whether to/from switched fabric 106 and at least one of VMEbus network or PCI network (parallel multi-drop bus network 108) occur through at least one multi-gigabit connector 118.

In an example of an embodiment of the invention, at least one multi-gigabit connector 118 and corresponding at least one multi-gigabit connector 120 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

In an embodiment, multi-service platform system 100 can include switch module 103 as described above. In an embodiment, backplane 104 and switch module 103 can have a set of interlocking, modular connectors designed to interlock with each other when switch module 103 is placed in a slot of multi-service platform system 100. In the embodiment shown, switch module 103 has at least one multi-gigabit connector 122 coupled to rear edge 121. In an embodiment, at least one multi-gigabit connector 122 can include printed circuit board (PCB) wafers (as opposed to metal pins), where wafers are held together in a plastic housing and couple to the switch module 103 using press to fit contacts. For example, at least one multi-gigabit connector 122 can use PCB based pinless interconnect that uses printed circuit wafers instead of traditional pin and socket contacts.

In an embodiment, at least one multi-gigabit connector 122 can use at least one of single ended or differential pair (not shown on switch module for clarity) signal configuration in the same connector. Multi-gigabit connector 122 can transfer data in excess of three gigabits per second per each differential pair. For example, differential pair can couple central switching resource 116 to switched fabric 106 and transfer data at a rate in excess of three gigabits per second. In an embodiment, differential pair can be a bonded differential pair. In one embodiment, at least one multi-gigabit connector 122 is coupled to communicatively interface switch module 103 with backplane 104, particularly switched fabric 106. In another embodiment, at least one multi-gigabit connector 122 is coupled to communicatively interface switch module 103 with backplane 104, where switched fabric 106 and at least one of VMEbus network or PCI network (parallel multi-drop bus network 108) are communicatively coupled to switch module 103 through at least one multi-gigabit connector 122.

In an embodiment, at least one multi-gigabit connector 122 is coupled to interface with at least one corresponding multi-gigabit connector 124 on backplane 104. At least one corresponding multi-gigabit connector 124 can be a female receptacle with metal beam spring leaf contacts which engage with the PCB wafers of multi-gigabit connector 122 when coupled together.

In an embodiment, at least one multi-gigabit connector 122 spans substantially the entire portion of the rear edge 121 of switch module 103. Rear edge 121 can include any number of multi-gigabit connectors 122 and be within the scope of the invention. In an embodiment, all communication between switch module 103 and backplane 104 occur exclusively through at least one multi-gigabit connector 122. In this embodiment, rear edge 121 of switch module 103 excludes a legacy connector, which can include traditional pin and socket connectors designed for low-speed data transfer. In other words, all data transfer and communication, whether to/from switched fabric 106 or at least one of VMEbus network or PCI network (parallel multi-drop bus network 108) occur through at least one multi-gigabit connector 122.

In an example of an embodiment of the invention, at least one multi-gigabit connector 122 and corresponding at least one multi-gigabit connector 124 can be a Tyco MultiGig RT connector manufactured by the AMP division of Tyco Electronics, Harrisburg, Pa. The invention is not limited to the use of the Tyco MultiGig RT connector, and any connector capable of throughput per differential pair of at least three gigabits per second is encompassed within the invention.

In an embodiment, payload module can include one or more storage modules 112, 113. For example, payload module 102 can include first storage module 112 and second storage module 113. In an embodiment, storage modules 112, 113 can include any device or medium for storing data. For example, storage modules 112, 113 can include spinning magnetic media or optical drives such as hard drives, CD-ROM drives, and the like. In another embodiment, storage modules 112, 113 can include solid-state storage devices such as RAM, flash memory, EEPROM, and the like. Any type of data storage device is within the scope of the invention.

Storage modules 112, 113 can send and receive data using any storage protocol 157 known in the art. For example, storage modules 112, 113 can use Small Computer System Interface (SCSI), Integrated Drive Electronics/AT Attachment (IDE/ATA), Enhanced IDE (EIDE), Fibrechannel, Internet SCSI (ISCSI), and the like. The invention is not limited by these storage protocols 157, and other storage protocols 157 are within the scope of the invention.

Payload module 102 can include at least one fabric-to-storage bridge 111. In an embodiment, fabric-to-storage bridge 111 translates data leaving storage modules 112, 113 from storage protocol 157 to switched fabric protocol 158. Also, fabric-to-storage bridge 111 functions to translate incoming packets in switched fabric protocol 158 to storage protocol 157. In an embodiment, switched fabric protocol 158 can include any packet based protocol used on a switched fabric 106, for example, InfiniBand™, Serial RapidIO™, FibreChannel™, Ethernet™, PCI Express™, Hypertransport™, and the like.

Figure 2:
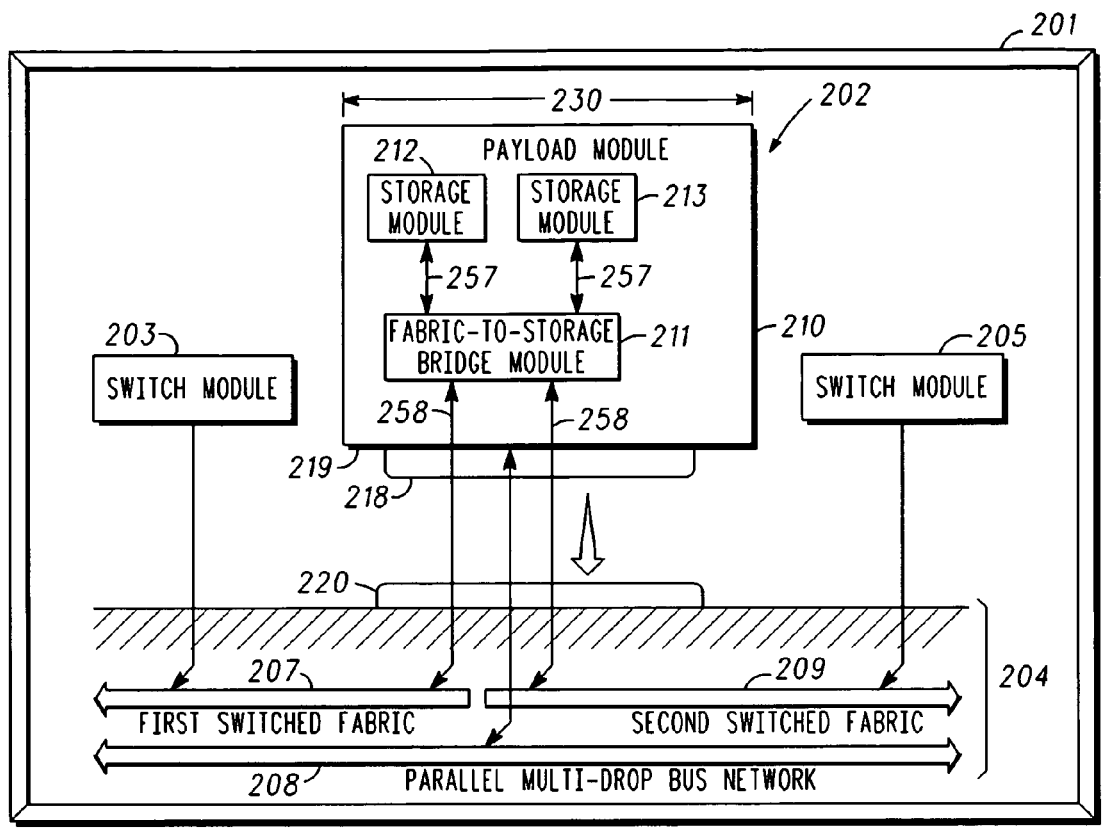
FIG. 2 depicts a multi-service platform system according to another embodiment of the invention.

FIG. 2 depicts a multi-service platform system 200 according to another embodiment of the invention. In the embodiment depicted in FIG. 2, like numbered elements represent elements discussed with reference to FIG. 1. For example, payload module 202 depicted in FIG. 2 is analogous to payload module 102 depicted in FIG. 1.

As shown in FIG. 2, switched fabric comprises first switched fabric 207 and second switched fabric 209 both of which are coincident on backplane 204 with parallel multi-drop bus network 208, which can include at least one of VMEbus and PCI bus. In an embodiment, first switched fabric 207 can be controlled by first switch module 203, and second switched fabric 209 can be controlled by second switch module 205. Both first switch module 203 and second switch module 205 can be located in separate slots within multi-service platform system 200 and are analogous to switch module 103 discussed with reference to FIG. 1.

As in FIG. 1, first storage module 212 and second storage module 213 communicate with fabric-to-storage bridge module 211 using storage protocol 257. Fabric-to-storage bridge module 211 functions to translate data between storage protocol 257 and switched fabric protocol 258 as described above. Storage modules 212, 213 are coupled to backplane 204 though at least one multi-gigabit connector 218 on rear edge 219 of payload module 202 as described above.

In an embodiment, first storage module 212 can store data exclusively for first switched fabric 207 or exclusively for second switched fabric 209. Also, second storage module 213 can store data exclusively for second switched fabric 209 or first switched fabric 207. As an example, if first storage module 212 is dedicated exclusively to first switched fabric 207, then only data communicated over first switched fabric 207 can be stored on first storage module 212. In this embodiment, payload module 202 can be pre-configured so as to assign first storage module 212 or second storage module 213 to one of first switched fabric 207 or second switched fabric 209. In another embodiment, both storage modules 212, 213 can be assigned to the same switched fabric, for example first switched fabric 207. Any combination of storage module assignments to particular switched fabrics is within the scope of the invention. Although two storage modules are depicted in FIG. 2, any number of storage modules coupled to payload module 202 is within the scope of the invention.

Figure 3:
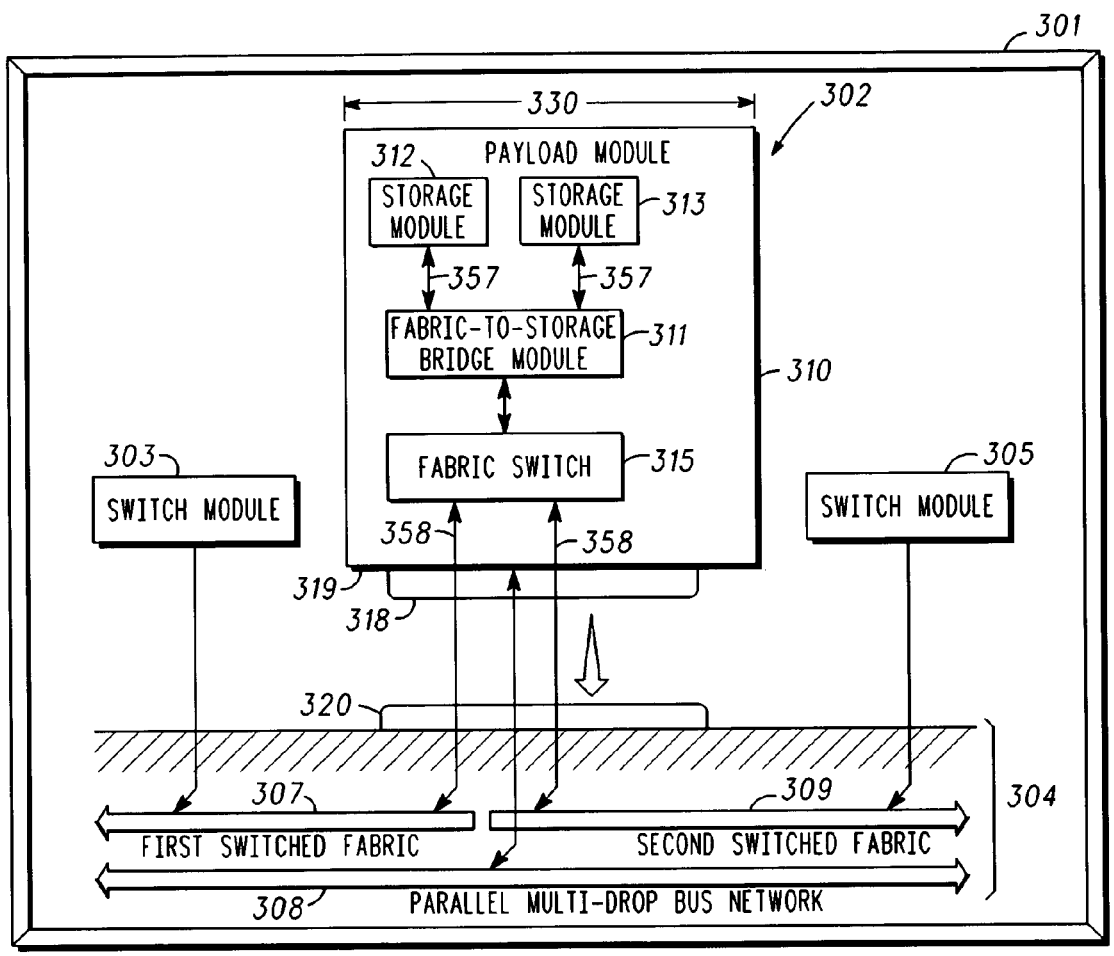
FIG. 3 depicts a multi-service platform system according to yet another embodiment of the invention.

FIG. 3 depicts a multi-service platform system 300 according to yet another embodiment of the invention. In the embodiment depicted in FIG. 3, like numbered elements represent elements discussed with reference to FIG. 1 and FIG. 2. For example, payload module 302 depicted in FIG. 3 is analogous to payload module 102 depicted in FIG. 1.

As shown in FIG. 3, switched fabric comprises first switched fabric 307 and second switched fabric 309 both of which are coincident on backplane 304 with parallel multi-drop bus network 308, which can include at least one of VMEbus network and PCI network. In an embodiment, first switched fabric 307 can be controlled by first switch module 303, and second switched fabric 309 can be controlled by second switch module 305. Both first switch module 303 and second switch module 305 can be located in separate slots within multi-service platform system 300.

As in FIG. 2, first storage module 312 and second storage module 313 communicate with fabric-to-storage bridge module 311 using storage protocol 357. Fabric-to-storage bridge module 311 functions to translate data between storage protocol 357 and switched fabric protocol 358 as described above. Storage modules 312, 313 are coupled to backplane 304 though at least one multi-gigabit connector 318 on rear edge 319 of payload module 302 as described above.

As shown in FIG. 3, payload module 302 can include fabric switch 315 communicatively interposed between fabric-to-storage bridge module 311 and at least one multi-gigabit connector 318. In an embodiment, fabric switch 315 can act as a router for storage modules 312, 313 on payload module 302. Both first storage module 312 and second storage module 313 are coupled to directly communicate with at least one of first switched fabric 307 and second switched fabric 309 via fabric switch 315.

In an embodiment, fabric switch 315 routes incoming and outgoing data such that data is routed to or from first storage module 312 or second storage module 313 respectively, and to or from first switched fabric 307 or second switched fabric 309 respectively. In an embodiment, first storage module 312 can store data exclusively for first switched fabric 307 or exclusively for second switched fabric 309. Also, second storage module 313 can store data exclusively for second switched fabric 309 or first switched fabric 307. In another embodiment, one or more of storage modules 312, 313 can be shared storage for data communicated on first switched fabric 307 and second switched fabric 309. Fabric switch 315 can route data to and from storage modules 312, 313 via a single fabric switch link as shown between fabric switch 315 and fabric-to-storage bridge module 311. In this embodiment, fabric switch 315 must route data packets to storage modules 312, 313 one at a time and cannot route data to both storage modules 312, 313 simultaneously.

In an embodiment, fabric switch 315 can be controlled externally by either switch module 303, 305 so as to route packets to the proper storage module 312, 313. In another embodiment, fabric switch 315 can be controlled by a processor coupled to payload module 302. In yet another embodiment, fabric switch 315 can operate to route data to and from storage modules 312, 313 based on header data in packets.

Figure 4:
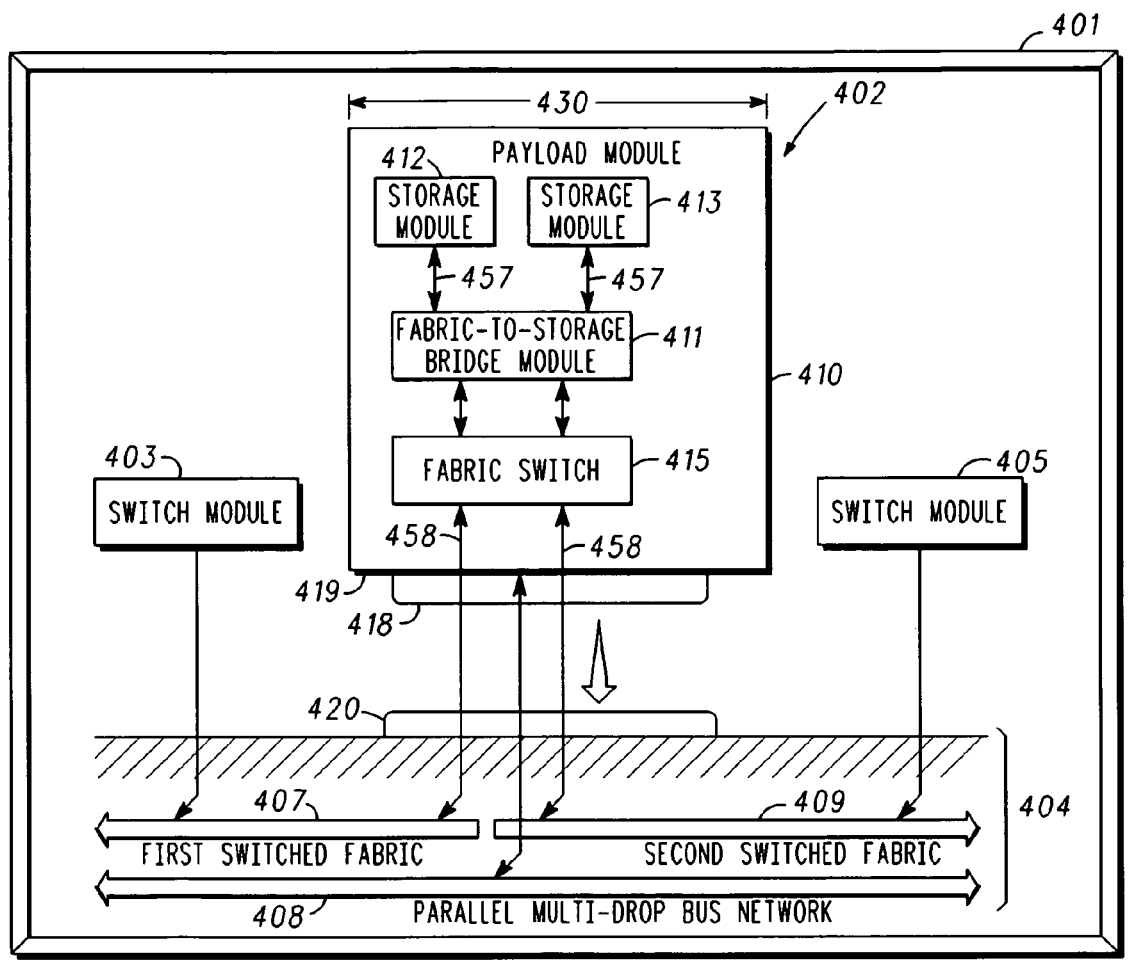
FIG. 4 depicts a multi-service platform system according to still another embodiment of the invention.

FIG. 4 depicts a multi-service platform system 400 according to still another embodiment of the invention. In the embodiment depicted in FIG. 4, like numbered elements represent elements discussed with reference to FIGS. 1, 2 and 3. For example, payload module 402 depicted in FIG. 4 is analogous to payload module 102 depicted in FIG. 1.

As shown in FIG. 4, switched fabric comprises first switched fabric 407 and second switched fabric 409 both of which are coincident on backplane 404 with parallel multi-drop bus network 408. In an embodiment, first switched fabric 407 can be controlled by first switch module 403, and second switched fabric 409 can be controlled by second switch module 405. Both first switch module 403 and second switch module 405 can be located in separate slots within multi-service platform system 400.

As in FIG. 1, first storage module 412 and second storage module 413 communicate with fabric-to-storage bridge module 411 using storage protocol 457. Fabric-to-storage bridge module 411 functions to translate data between storage protocol 457 and switched fabric protocol 458 as described above. Storage modules 412, 413 are coupled to backplane 404 though at least one multi-gigabit connector 418 as described above.

As shown in FIG. 4, payload module 402 includes fabric switch 415 communicatively interposed between fabric-to-storage bridge module 411 and at least one multi-gigabit connector 418. In an embodiment, fabric switch 415 can act as a router for storage modules 412, 413 on payload module 402. Both first storage module 412 and second storage module 413 are coupled to directly communicate with at least one of first switched fabric 407 and second switched fabric 409 via fabric switch 415.

In an embodiment, fabric switch 415 routes incoming and outgoing data such that data is routed to or from first storage module 412 or second storage module 413 respectively, and to or from first switched fabric 407 or second switched fabric 409 respectively. In an embodiment, first storage module 412 can store data exclusively for first switched fabric 407 or exclusively for second switched fabric 409. Also, second storage module 413 can store data exclusively for second switched fabric 409 or first switched fabric 407. In another embodiment, one or more of storage modules 412, 413 can be shared storage for data communicated on first switched fabric 407 and second switched fabric 409. Fabric switch 415 can route data to and from storage modules 412, 413 via fabric switch links as shown between fabric switch 415 and fabric-to-storage bridge module 411. In this embodiment, fabric switch 415 can route data packets to storage modules 412, 413 from both first switched fabric 407 and second switched fabric 409 simultaneously.

In an embodiment, fabric switch 415 can be controlled externally by either switch module 403, 405 so as to route packets to the proper storage module 412, 413. In another embodiment, fabric switch 415 can be controlled by a processor coupled to payload module 402. In yet another embodiment, fabric switch 415 can operate to route data to and from storage modules 412, 413 based on header data in packets.

Figure 5:
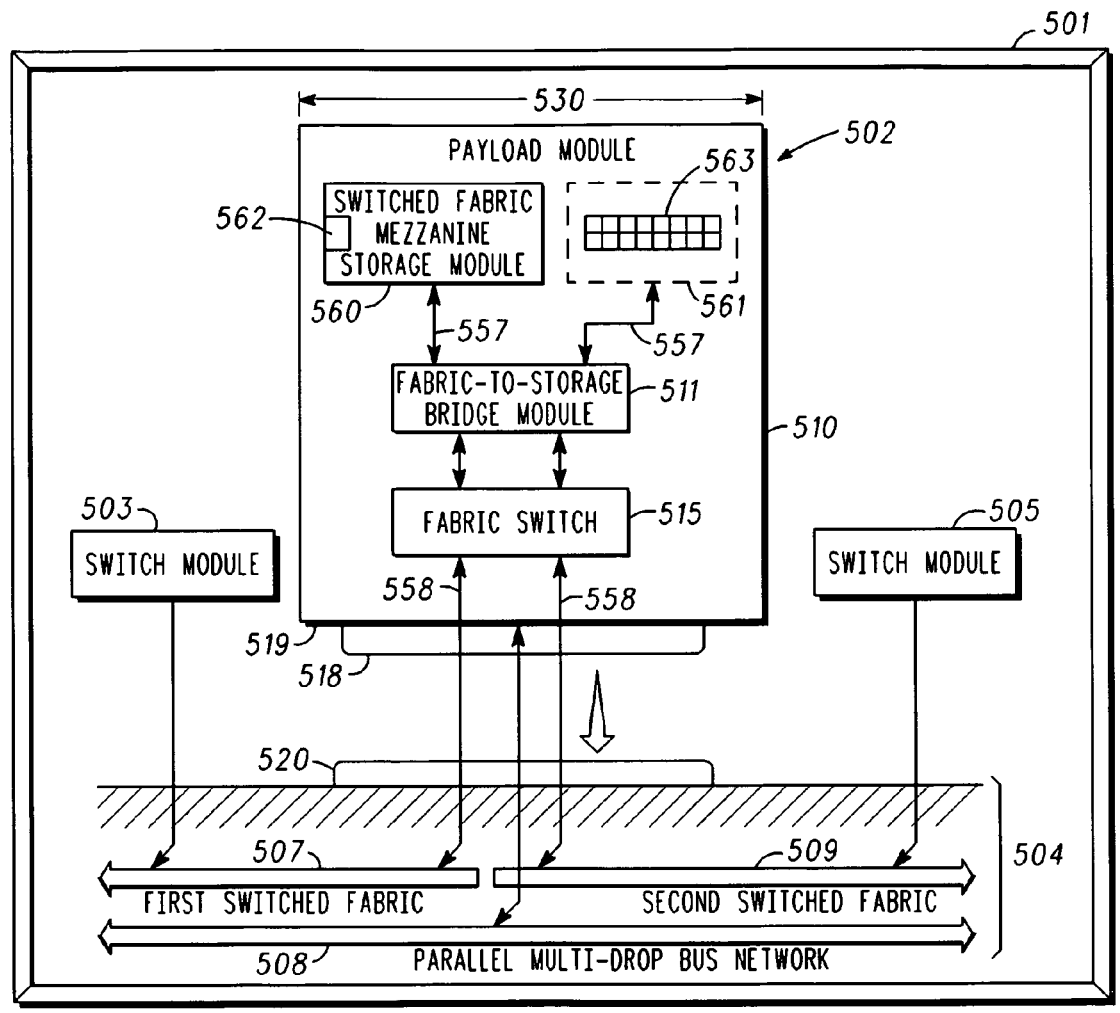
FIG. 5 depicts a multi-service platform system according to still yet another embodiment of the invention.

FIG. 5 depicts a multi-service platform system 500 according to still yet another embodiment of the invention. In the embodiment depicted in FIG. 5, like numbered elements represent elements discussed with reference to FIGS. 1, 2, 3 and 4. For example, payload module 502 depicted in FIG. 5 is analogous to payload module 102 depicted in FIG. 1.

In an embodiment, payload module 502 can include any number of expansion cards, which can be for example, mezzanine cards. An exemplary mezzanine card can be a Common Mezzanine Card (CMC) having a CMC form factor. CMC form factor, including mechanical dimensions, electrical specifications, and the like, are known in the art and set forth in the Institute of Electrical and Electronics Engineers (IEEE) standard P1386.

A particular example of an embodiment is a switched fabric enabled mezzanine card (XMC). XMC's are described in VITA 42 promulgated by VMEbus International Trade Association (VITA), P.O. Box 19658, Fountain Hills, Ariz., 85269. In an embodiment, switched fabric enabled mezzanine card can be coupled to payload module 502 and communicatively couple switched fabric enabled mezzanine card with backplane 504 and switched fabric 506. Payload module 502 can include any number of switched fabric enabled mezzanine cards. In an embodiment, payload module 502 can include up to two switched fabric enabled mezzanine cards.

In an embodiment, a switched fabric enabled mezzanine card can be a switched fabric mezzanine storage module 560. In this embodiment, switched fabric mezzanine storage module 560 can have the form factor of XMC's as described in VITA 42 and include one or more storage modules 562 communicatively mounted thereon.

In an embodiment, storage modules 562 can include any device or medium for storing data. For example, storage module 562 can include spinning magnetic media or optical drives such as hard drives, CD-ROM drives, and the like. In another embodiment, storage module 562 can include solid-state storage devices such as RAM, flash memory, EEPROM, and the like. Any type of data storage device is within the scope of the invention.

Storage module 562 can send and receive data using any storage protocol 557 known in the art. For example, storage module 562 can use Small Computer System Interface (SCSI), Integrated Drive Electronics/AT Attachment (IDE/ATA), Enhanced IDE (EIDE), Fibrechannel, Internet SCSI (ISCSI), and the like. The invention is not limited by these storage protocols 557, and other storage protocols 557 are within the scope of the invention.

In an embodiment, switched fabric mezzanine storage module 560, including storage module 562 can be coupled to directly communicate with backplane and at least one of first switched fabric 507 and second switched fabric 509. Directly communicate can mean that although switched fabric mezzanine storage module 560 and storage module 562 are coupled to payload module 502, payload module 502 does not control or manage switched fabric mezzanine storage module 560. In effect, payload module 502 can omit the use of any processors or buses to control or manage switched fabric mezzanine storage module 560. In this embodiment, any switch module 503, 505 can control switched fabric mezzanine storage module 560 without any input from payload module 502.

In an embodiment, switched fabric mezzanine storage module 560 is coupled directly to backplane 504 and hence at least one of first switched fabric 507 and second switched fabric 509. In this embodiment, payload module 502 acts as a carrier module for switched fabric mezzanine storage module 560, with payload module 502 acting merely as a connection point for switched fabric mezzanine storage module 560 to physically interface with at least one of first switched fabric 507 and second switched fabric 509. In this embodiment, payload module 502 does not have to appear as an active node on at least one of first switched fabric 507 and second switched fabric 509. However, in another embodiment, payload module 502 can appear as an active node on either or both of parallel multi-drop bus network 508 or at least one of first switched fabric 507 and second switched fabric.

In an embodiment, since switched fabric mezzanine storage module 560 is coupled directly to at least one of first switched fabric 507 and second switched fabric and backplane 504, switched fabric mezzanine storage module 560 is coupled to directly communicate with at least one of switch module 503, 505. Hence, in this embodiment, at least one of switch module 503, 505 can directly control switched fabric mezzanine storage module 560. In effect, switched fabric mezzanine storage module 560 is an independent node on at least one of first switched fabric 507 and second switched fabric that can operate on at least one of first switched fabric 507 and second switched fabric without guidance, management or interference from payload module 502. In an embodiment, switched fabric mezzanine storage module 560 can be coupled to communicate and exchange data with parallel multi-drop bus network 508 as well.

In an embodiment, payload module 502 can include connection site 561 for coupling switched fabric mezzanine storage module 560 to payload module 502, which can include a footprint of an area required for coupling switched fabric mezzanine storage module 560 to payload module 502. Connection site 561 can include any type of electrical or optical connector to interface switched fabric mezzanine storage module 560 to payload module 502. For example, connection site 561 can include switched fabric connector 563, where switched fabric mezzanine storage module 560 is directly coupled to backplane 504 through switched fabric connector.

Switched fabric connector 563 is coupled to interface with its counterpart on switched fabric mezzanine storage module 560 in a manner analogous to that described with reference to at least one multi-gigabit connector 518. Switched fabric connector 563 can be designed for use in high-speed switched fabric networks and are compatible with any of a plurality of switched fabric network protocols as described above. In an example of an embodiment of the invention, switched fabric connector 563 can be a SAMARRAY YFW connector manufactured by Santec USA, Albany, Ind. The invention is not limited to the use of the Tyco RT connector, and any connector capable of handling data using any of the plurality of switched fabric network standards is encompassed within the invention.

As described above with reference to FIGS. 2, 3 and 4, first switched fabric 507 can be controlled by first switch module 503, and second switched fabric 509 can be controlled by second switch module 505. Both first switch module 503 and second switch module 505 can be located in separate slots within multi-service platform system 500.

In another embodiment, payload module 502 can contribute to the operation of switched fabric mezzanine storage module 560. As an example, switched fabric mezzanine storage module 560 can communicate with fabric-to-storage bridge module 511 using storage protocol 557. Fabric-to-storage bridge module 511 functions to translate data between storage protocol 557 and switched fabric protocol 558 as described above. Switched fabric mezzanine storage module 560 can be coupled to backplane 504 though at least one multi-gigabit connector 518 as described above.

As shown in FIG. 5, payload module 502 can include fabric switch 515 communicatively interposed between fabric-to-storage bridge module 511 and at least one multi-gigabit connector 518. In an embodiment, fabric switch 515 can act as a router for switched fabric mezzanine storage module 560, particularly storage module 562 on payload module 502. Switched fabric mezzanine storage module 560 can be coupled to directly communicate with at least one of first switched fabric 507 and second switched fabric 509 via fabric switch 515.

In an embodiment, fabric switch 515 routes incoming and outgoing data such that data is routed to or from first switched fabric mezzanine storage module 560, and to or from first switched fabric 507 or second switched fabric 509 respectively. In an embodiment, switched fabric mezzanine storage module 560 can be shared storage for data communicated on first switched fabric 507 and second switched fabric 509. Fabric switch 515 can route data to and from switched fabric mezzanine storage module 560 via fabric switch links as shown between fabric switch 515 and fabric-to-storage bridge module 511. In this embodiment, fabric switch 515 can route data packets to switched fabric mezzanine storage module 560 from both first switched fabric 507 and second switched fabric 509 simultaneously. In another embodiment, fabric switch 515 can only route data from one of first switched fabric 507 or second switched fabric 509.

In an embodiment, fabric switch 515 can be controlled externally by either switch module 503, 505 so as to route packets to the switched fabric mezzanine storage module 560. In another embodiment, fabric switch 515 can be controlled by a processor coupled to payload module 502. In yet another embodiment, fabric switch 515 can operate to route data to and from switched fabric mezzanine storage module 560 based on header data in packets.

Although payload module 502 depicts one switched fabric mezzanine storage module 560 and connection site 561 to attach another such module, the invention is not limited to two such modules coupled to payload module 502. Any number of switched fabric mezzanine storage modules 560 coupled to payload module 502 is within the scope of the invention. In addition, any of the embodiments described above with reference to FIGS. 1-4 can be combined with the embodiments described with reference to FIG. 5 and be within the scope of the invention. Although switched fabric mezzanine storage module 560 depicts only one storage module 562, any number of storage modules 562 can be coupled to switched fabric mezzanine storage module 560 and be within the scope of the invention.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system, comprising:
   a backplane;
   a switched fabric on the backplane;
   at least one of a VMEbus network and a PCI network coincident with the switched fabric on the backplane;
   a payload module having one of a 3U form factor, a 6U form factor and a 9U form factor, wherein the payload module is communicatively coupled with the backplane using the switched fabric and at least one of the VMEbus network and the PCI network;
   at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector; and
   a storage module coupled to the payload module, wherein the storage module is coupled to communicate with the switched fabric.

2. The multi-service platform system of claim 1, wherein communication between the backplane and the payload module occur exclusively through the at least one multi-gigabit connector.

3. The multi-service platform system of claim 1, wherein at least one multi-gigabit connector spans substantially an entire portion of the rear edge of the payload module.

4. The multi-service platform system of claim 1, further comprising a fabric-to-storage bridge module coupled to the payload module, wherein the fabric-to-storage bridge module is coupled to interface the storage module to the switched fabric.

5. The multi-service platform system of claim 1, wherein the storage module operates using one of SCSI, IDE/ATA, EIDE, Fibrechannel and ISCSI storage protocols.

6. The multi-service platform system of claim 1, wherein the switched fabric comprises a first switched fabric and a second switched fabric, and wherein the storage module is coupled to store data communicated from at least one of the first switched fabric and the second switched fabric.

7. The multi-service platform system of claim 1, wherein the storage module is coupled to communicate with at least one of the VMEbus network and the PCI network.

8. The multi-service platform system of claim 1, wherein the rear edge of the payload module excludes a legacy connector.

9. A multi-service platform system, comprising:
   a backplane;
   a switched fabric on the backplane;
   at least one of a VMEbus network and a PCI network coincident with the switched fabric on the backplane;
   a payload module having one of a 3U form factor, a 6U form factor and a 9U form factor, wherein the payload module is communicatively coupled with the backplane using the switched fabric and at least one of the VMEbus network and the PCI network;
   at least one multi-gigabit connector coupled to a rear edge of the payload module, wherein the at least one multi-gigabit connector is coupled to communicatively interface the payload module to the backplane, and wherein the switched fabric and at least one of the VMEbus network and the PCI network are communicatively coupled with the payload module through the at least one multi-gigabit connector;
   a first storage module coupled to the payload module, wherein the first storage module is coupled to communicate with the switched fabric; and
   a second storage module coupled to the payload module, wherein the second storage module is coupled to communicate with the switched fabric.

10. The multi-service platform system of claim 9, further comprising a fabric-to-storage bridge module coupled to the payload module, wherein the fabric-to-storage bridge module is coupled to interface at least one of the first storage module and the second storage module to the switched fabric.

11. The multi-service platform system of claim 9, further comprising a fabric switch coupled to the payload module, wherein the fabric switch is coupled to selectively communicate data between the switched fabric and one of the first storage module and the second storage module.

12. The multi-service platform system of claim 11, wherein the switched fabric comprises a first switched fabric and a second switched fabric, and wherein the fabric switch communicatively couples one of the first storage module and the second storage module to one of the first switched fabric and the second switched fabric.

13. The multi-service platform system of claim 11, wherein the switched fabric comprises a first switched fabric and a second switched fabric, wherein the fabric switch communicatively couples the first storage module to the first switched fabric, and wherein the fabric switch communicatively couples the second storage module to the second switched fabric.

14. The multi-service platform system of claim 9, wherein communication between the backplane and the payload module occurs exclusively through the at least one multi-gigabit connector.

15. The multi-service platform system of claim 9, wherein at least one multi-gigabit connector spans substantially an entire portion of the rear edge of the payload module.

16. The multi-service platform system of claim 9, wherein at least one of the first or second storage modules is coupled to communicate with at least one of the VMEbus network and the PCI network.

17. A payload module, comprising:
a storage module coupled to the payload module, wherein the storage module is coupled to communicate with a switched fabric, and wherein the payload module has one of a 3U form factor, a 6U form factor and a 9U form factor;
at least one multi-gigabit connector coupled to a rear edge of the payload module and to the storage module, wherein the at least one multi-gigabit connector is coupled to communicatively interface the storage module to a backplane, wherein the backplane includes a switched fabric coincident with at least one of a VMEbus network and a PCI network, and wherein the switched fabric and at least one of the VMEbus network and the PCI network are communicatively coupled to the storage module through the at least one multi-gigabit connector; and
a fabric-to-storage bridge module coupled to interface the storage module to the switched fabric, wherein the switched fabric operates coincident with a parallel bus on a backplane.

18. The payload module of claim 17, wherein the storage module operates using one of SCSI, IDE/ATA, EIDE, Fibre-channel and ISCSI storage protocols.

19. The payload module of claim 17, wherein the switched fabric comprises a first switched fabric and a second switched fabric, and wherein the storage module is coupled to store data communicated from at least one of the first switched fabric and the second switched fabric.

20. The payload module of claim 17, wherein communication between the backplane and the payload module occurs exclusively through the at least one multi-gigabit connector.

21. The payload module of claim 17, wherein at least one multi-gigabit connector spans substantially an entire portion of the rear edge of the payload module.

22. The payload module of claim 17, wherein the storage module is coupled to communicate with at least one of the VMEbus network and the PCI network.

23. A payload module, comprising:
a first storage module coupled to the payload module, wherein the first storage module is coupled to communicate with a switched fabric, and wherein the payload module has one of a 3U form factor, a 6U form factor and a 9U form factor;
a second storage module coupled to the payload module, wherein the second storage module is coupled to communicate with the switched fabric;
at least one multi-gigabit connector coupled to a rear edge of the payload module, wherein the at least one multi-gigabit connector is coupled to communicatively interface the payload module to a backplane, wherein the backplane includes a switched fabric coincident with at least one of a VMEbus network and a PCI network, and wherein the switched fabric and at least one of the VMEbus network and the PCI network are communicatively coupled to the first and second storage module through the at least one multi-gigabit connector; and
a fabric-to-storage bridge module coupled to interface at least one of the first storage module and the second storage module to the switched fabric.

24. The payload module of claim 23, further comprising a fabric switch coupled to the payload module, wherein the fabric switch is coupled to selectively communicate data between the switched fabric and one of the first storage module and the second storage module.

25. The payload module of claim 24, wherein the switched fabric comprises a first switched fabric and a second switched fabric, and wherein the fabric switch communicatively couples one of the first storage module and the second storage module to one of the first switched fabric and the second switched fabric.

26. The payload module of claim 24, wherein the switched fabric comprises a first switched fabric and a second switched fabric, wherein the fabric switch communicatively couples the first storage module to the first switched fabric, and wherein the fabric switch communicatively couples the second storage module to the second switched fabric.

27. The payload module of claim 23, wherein communication between the backplane and the payload module occur exclusively through the at least one multi-gigabit connector.

28. The payload module of claim 23, wherein at least one multi-gigabit connector spans substantially an entire portion of the rear edge of the payload module.

29. The payload module of claim 23, wherein one of the first or second storage modules is coupled to communicate with at least one of the VMEbus network and the PCI network.

* * * * *